(12) United States Patent
Lim et al.

(10) Patent No.: US 7,974,596 B2
(45) Date of Patent: Jul. 5, 2011

(54) POWER CONTROL SCHEME FOR A POWER AMPLIFIER

(75) Inventors: Lysander Lim, Austin, TX (US); David Pehlke, Austin, TX (US); John Khoury, Basking Ridge, NJ (US); Vincent Leung, Plainsboro, NJ (US)

(73) Assignee: Silicon Laboratories Inc., Austin, TX (US)

( * ) Notice: Subject to any disclaimer, the term of this patent is extended or adjusted under 35 U.S.C. 154(b) by 679 days.

(21) Appl. No.: 11/646,055

(22) Filed: Dec. 27, 2006

(65) Prior Publication Data

US 2008/0076378 A1 Mar. 27, 2008

Related U.S. Application Data

(60) Provisional application No. 60/846,548, filed on Sep. 22, 2006.

(51) Int. Cl.
*H01Q 11/12* (2006.01)
*H04B 1/04* (2006.01)

(52) U.S. Cl. ............... 455/126; 455/127.4; 455/522

(58) Field of Classification Search .......... 455/126, 455/127.2–127.4, 115.1, 67.11, 231
See application file for complete search history.

(56) References Cited

U.S. PATENT DOCUMENTS

| | | | | |
|---|---|---|---|---|
| 5,128,629 A * | 7/1992 | Trinh | ............... | 330/129 |
| 5,159,283 A * | 10/1992 | Jensen | ............... | 330/129 |
| 5,278,994 A * | 1/1994 | Black et al. | ............... | 455/126 |
| 5,313,658 A * | 5/1994 | Nakamura | ............... | 455/69 |
| 5,371,473 A * | 12/1994 | Trinh et al. | ............... | 330/129 |
| 5,515,008 A * | 5/1996 | Ueda et al. | ............... | 330/280 |
| 5,530,923 A * | 6/1996 | Heinonen et al. | ............... | 455/126 |
| 5,548,616 A * | 8/1996 | Mucke et al. | ............... | 375/295 |
| 5,905,962 A * | 5/1999 | Richardson | ............... | 455/522 |
| 6,032,052 A * | 2/2000 | Richardson | ............... | 455/522 |
| 6,181,188 B1 * | 1/2001 | Shibata | ............... | 327/331 |
| 6,553,212 B1 | 4/2003 | Wey | ............... | 455/126 |
| 6,734,729 B1 | 5/2004 | Andrys et al. | ............... | 330/129 |
| 6,735,420 B2 * | 5/2004 | Baldwin | ............... | 455/127.2 |
| 6,795,712 B1 * | 9/2004 | Vakilian et al. | ............... | 455/522 |
| 6,801,759 B1 * | 10/2004 | Saifuddin | ............... | 455/127.1 |
| 6,828,859 B2 * | 12/2004 | Dupuis | ............... | 330/279 |
| 6,868,279 B2 * | 3/2005 | Sahlman et al. | ............... | 455/522 |
| 7,075,969 B2 | 7/2006 | Zeira et al. | ............... | 375/130 |
| 7,092,686 B2 | 8/2006 | Amanullah et al. | ............... | 455/127.1 |
| 7,095,988 B2 | 8/2006 | Ben-Ayun et al. | ............... | 455/126 |
| 7,106,805 B2 * | 9/2006 | Atkinson et al. | ............... | 375/295 |
| 7,110,724 B1 * | 9/2006 | Epperson et al. | ............... | 455/72 |
| 7,170,953 B2 * | 1/2007 | Kaczynski | ............... | 375/297 |
| 7,209,717 B2 * | 4/2007 | Okada et al. | ............... | 455/126 |
| 7,340,235 B1 * | 3/2008 | Madsen et al. | ............... | 455/240.1 |
| 7,353,006 B2 * | 4/2008 | Gels et al. | ............... | 455/126 |
| 7,471,935 B2 * | 12/2008 | Barak et al. | ............... | 455/127.2 |
| 7,711,327 B2 * | 5/2010 | Sowlati et al. | ............... | 455/73 |
| 2002/0142741 A1 * | 10/2002 | Molnar et al. | ............... | 455/127 |
| 2004/0198261 A1 * | 10/2004 | Xiong | ............... | 455/115.1 |
| 2005/0130595 A1 * | 6/2005 | Shurvinton et al. | ............... | 455/67.11 |
| 2005/0218989 A1 * | 10/2005 | Tsutsui et al. | ............... | 330/285 |

* cited by examiner

*Primary Examiner* — Duc M Nguyen

(74) *Attorney, Agent, or Firm* — Trop, Pruner & Hu, P.C.

(57) ABSTRACT

In one embodiment, a method includes detecting a power level of a power amplifier coupled to a transceiver during a current burst of a radio communication and providing the detected power level from the power amplifier to the transceiver and controlling a power level of the power amplifier during a next burst based on the detected power level of the current burst.

24 Claims, 7 Drawing Sheets

POWER CONTROL SCHEME FOR A POWER AMPLIFIER

This application claims priority to U.S. Provisional Patent Application No. 60/846,548 filed on Sep. 22, 2006 in the name of Lysander Lim and David Pehlke, entitled A POWER CONTROL SCHEME FOR A POWER AMPLIFIER.

FIELD OF THE INVENTION

Embodiments of the present invention relate to controlling transmission power in a wireless system.

BACKGROUND

In wireless systems such as cellular systems, information is transmitted wirelessly from a mobile station such as a cellular telephone, mobile device, portable digital assistant or similar device via a transceiver that is coupled through a power amplifier (PA) to an antenna. To maintain adequate performance, the mobile station should transmit power in accordance with the confines set forth by a given communication protocol. The detection and correction of transmit power is used to maintain call quality, especially in poor radio environments where adverse load conditions can be imposed by the antenna. A transmit chain of the mobile station thus should be able to intelligently sense its available and/or delivered power and provide a correction to adjust to nominal target levels.

While real-time closed-loop systems are available to dynamically correct power instantaneously, i.e., within a given radio burst, such systems can suffer from stability, noise and acquisition/settling time issues. Furthermore, such closed-loop systems are specifically adapted for a given combination of transceiver and PA, and cannot easily scale across PAs of various manufacturers. Other systems implement an open-loop control configuration. While such open loop control is easily managed as there is no need for feedback, the control afforded by such a system is limited, and variations in antenna loading among other radio environment conditions can negatively affect proper transmit power.

SUMMARY OF THE INVENTION

In one aspect, the present invention includes a method for receiving a detected power level of a power amplifier during a current burst of a radio communication and controlling a power level of the power amplifier during a next burst of the radio communication based on the detected power level of the current burst. That is, a current power level may be maintained for the current burst during the current burst, and only after completion of the current burst is the power level adjusted.

Another aspect of the present invention is directed to a transceiver that includes an interface to receive transmit power control information from a processor, a memory to store first parameter information for a first burst of a data transmission from the transceiver, and a controller coupled to the interface and the memory to receive the transmit power control information and the first parameter information and to determine second parameter information for a second burst of the data transmission based on the first parameter information and the transmit power control information. The controller may receive power sample information from a power amplifier and determine the second parameter information further based on this information. Sampling of the power sample information may occur at various portions of the first burst, in different implementations.

Yet other implementations are directed to a system that includes a transceiver having an interface to receive power control information from a processor and a controller coupled to the interface to determine a power control update for a succeeding burst of a multi-slot burst communication based on the power control information and feedback information from a preceding burst of the multi-slot burst communication, along with a power amplifier to provide the feedback information and an antenna to transmit the multi-slot burst communication. The controller may be configured to determine the power control update during the preceding burst and to apply the power control update during an inter-burst period between the preceding burst and the succeeding burst. The transceiver may include a controllable amplifier to be controlled via the power control update during the succeeding burst, where the controllable amplifier can be controlled by a first power control update during the preceding burst. The controller may determine the power control update using this first power control update.

DETAILED DESCRIPTION

In various embodiments, the power of a current radio burst may be measured and based on such power information, a correction for the following burst may be determined. In this way, real-time stability challenges may be limited. Still further, noise degradation and extended acquisition/locking times may also be avoided. Thus embodiments provide a solution having an improved timing budget for determining correction information while regulating transmit power as accurately as a continuous-time closed-loop implementation.

In certain embodiments, burst power at a PA may be measured at a maximum of the ramp of the burst, and measurements may be made before, during, or after the useful data portion of a given time slot. Based on the power information detected, a comparison may be made to a target value (i.e., threshold value) which may be obtained, e.g., via factory calibration. In some embodiments the burst that is measured may be a burst corresponding to a nominal target or a test burst at a lower power with less susceptibility for degradation in spectrum due to switching and IR drop causing inadvertent phone shut off at low battery conditions.

Based on the comparison, if the detected power varies from the nominal target an adjustment may be calculated and implemented in a next burst. For example, in some implementations a threshold power value may correspond to a nominal load impedance, which may be, for example, a 50Ω impedance level of an antenna. However, given actual operating conditions, such load may vary depending on phone location and so forth. Accordingly, if the detected power varies from this threshold level due to environmental or other conditions (e.g., antenna voltage standing wave ratio (VSWR)), an adjustment may be made in the following burst.

Figure 1A:
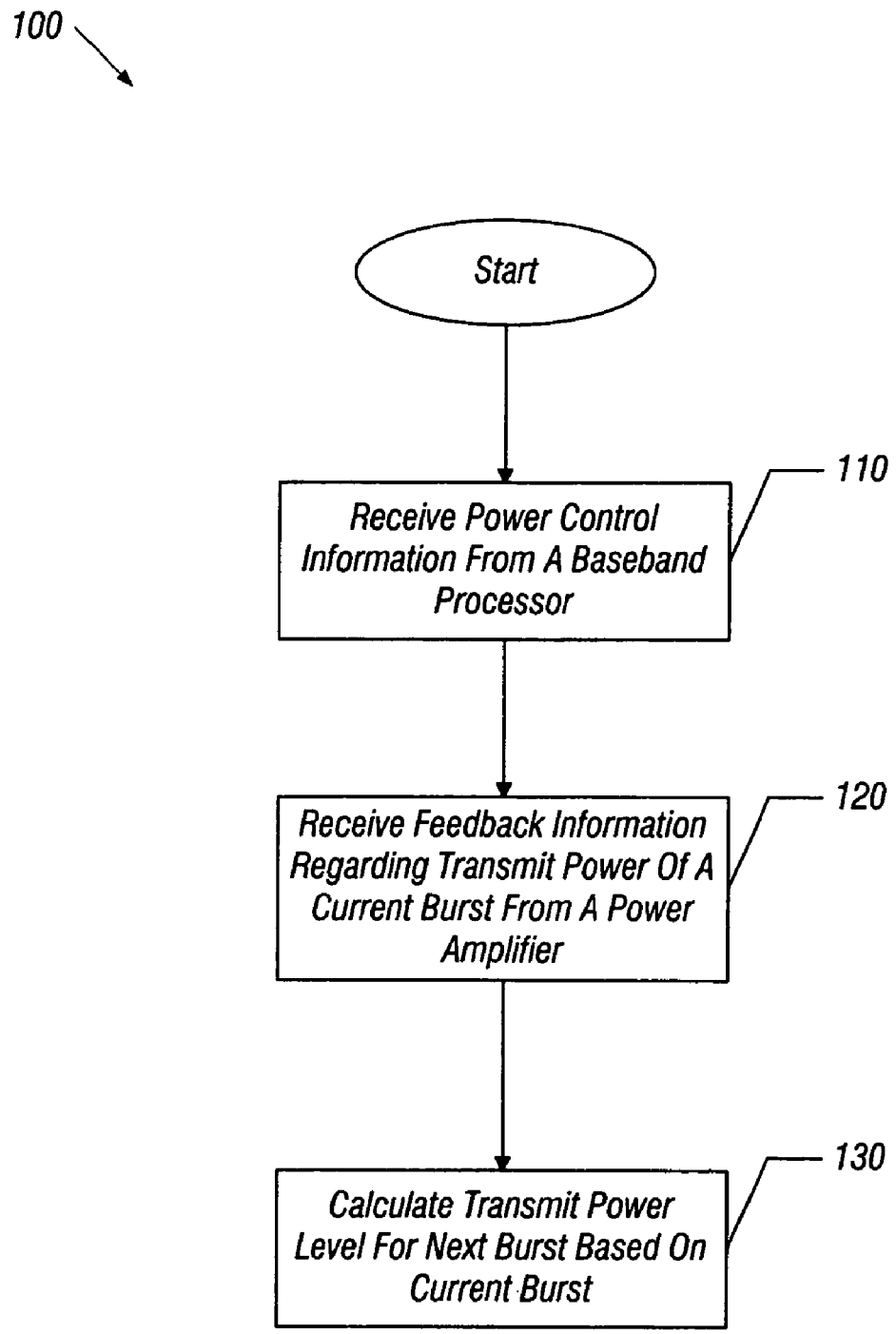
FIG. 1A is a flow diagram of a method in accordance with one embodiment of the present invention.

Referring now to FIG. 1A, shown is a flow diagram of a method in accordance with one embodiment of the present invention. As shown in FIG. 1A, method 100 may be used by a transceiver or other such radio device or a baseband device coupled to the radio device to enable closed-loop control of transmit power in accordance with an embodiment of the present invention. As shown in FIG. 1A, method 100 may begin by receiving power control information from a baseband processor (block 110). For example, in one embodiment such power control information may be digitally received, e.g., via a digital interface between a transceiver and a baseband processor. In one such embodiment, the power control information may include, for example, a nominal target level for controlling an amplifier or other gain block in a transmit path, as well as a nominal reference level with regard to detected power from a PA, along with a limit value indicating a maximum change allowable to the nominal level. Additionally, the transceiver may receive feedback information regarding transmit power of a current burst from the PA (block 120). For example, a voltage signal, e.g., an analog signal may be continuously provided to the transceiver from the PA that is indicative of the transmit power level of the current burst. Based on this received information (i.e., from both baseband processor and PA), the transceiver can calculate a transmit power level for the next burst based on the current burst (block 130). The calculations may be performed in a wide variety of manners. The method 100 thus implements a burst-by-burst closed-loop algorithm for determining a transmit power level for a next burst based on a previous burst.

Figure 1B:
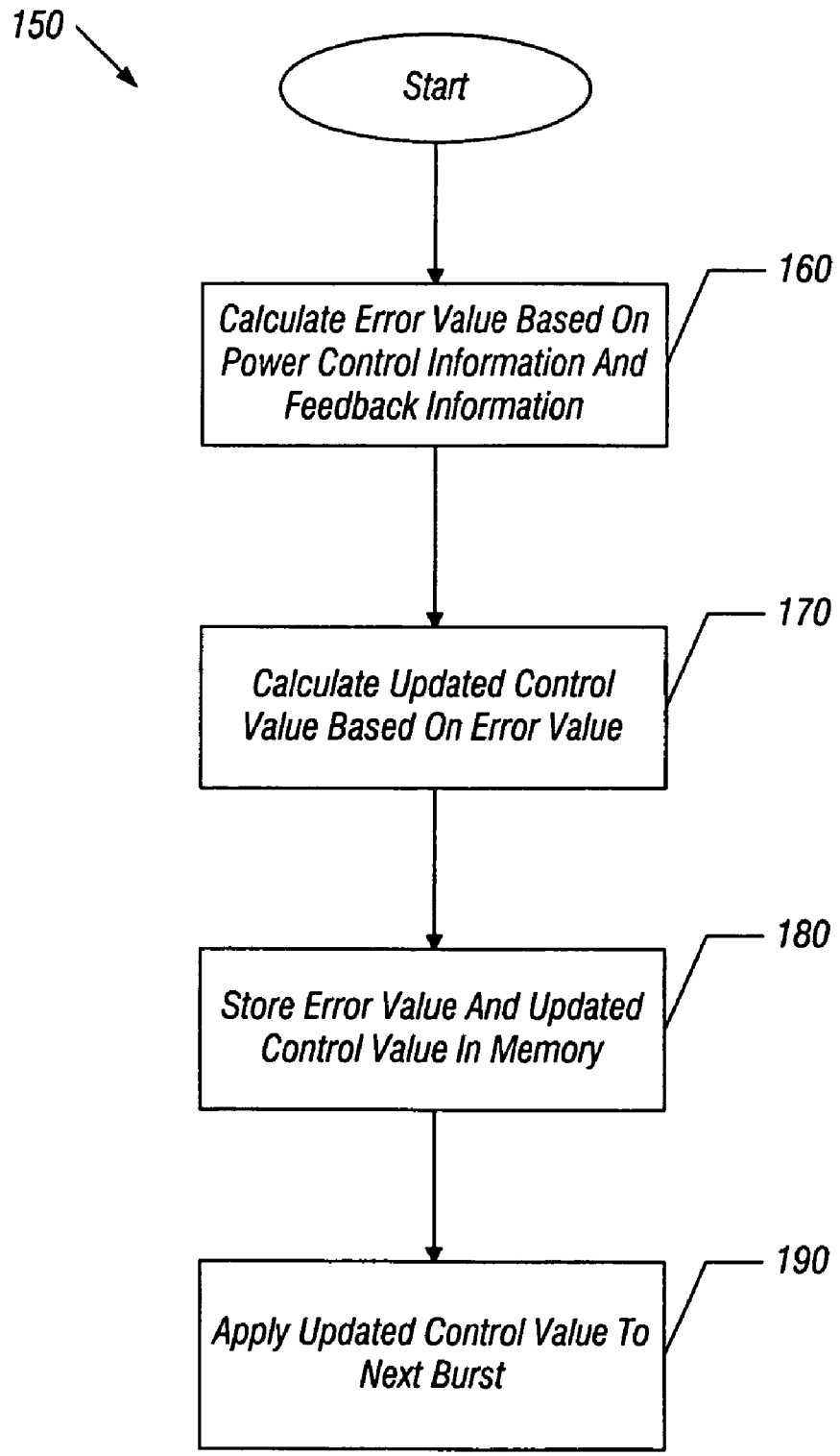
FIG. 1B is a flow diagram of a method for calculating transmit power levels in accordance with an embodiment of the present invention.

Referring now to FIG. 1B, shown is a flow diagram of a method for calculating transmit power levels in accordance with an embodiment of the present invention. Method 150 of FIG. 1B may be performed in a transceiver and may correspond, in one embodiment, to block 130 of FIG. 1A discussed above. As shown in FIG. 1B, method 150 may begin by calculating an error value based on power control information received from the baseband processor and feedback information from the PA (block 160). For example, the error value may be calculated as a difference between a nominal value for the power level and the detected power level. Based on this calculated error value, an updated control value may be calculated (block 170). That is, a control value for a gain block, e.g., within the transceiver or PA may be determined. In one embodiment, the control value may be calculated based on a nominal control value for the gain block (e.g., as provided by a baseband processor) and a delta value that is a function of the error value and a delta value for a previous burst. The calculated information, namely the error value and the delta value may be stored, e.g., in a volatile memory of the transceiver for later use (block 180). Finally, the updated control value may be applied to a next burst (block 190). While shown with this particular implementation in the embodiment of FIG. 1B, the scope of the present invention is not limited in this regard.

Various embodiments may detect the transmit power in different ways. As examples, the power may be detected, e.g., as forward available, reflected, or delivered power to a coupler, among many others. In other implementations, a DC current or sampled mirror replicas of the power may be analyzed to obtain the forward and/or delivered power. In some implementations, multiple types of power measurements may be leveraged, such as forward and reflected power levels. As an example, forward power may be sampled first and then reflected power sampled. In other implementations, these values may be sampled simultaneously. These sampled values may be used to determine a correction. As one example, a difference between forward and reflected power may constitute a delivered power value which may be used in determining a correction value. Thus detected power levels may be used to control delivered power based on a calculation of how much power is reaching a load.

Furthermore, the timing of power sampling may vary in different implementations. In some embodiments power may be measured during a useful portion of a burst, during ramping periods, during a lower power test burst, among others. For example, sampling may be performed during a timing critical time period such as transmission of tail symbols during ramping or during a less timing critical time period such as during transmission of a midamble training sequence. Based on detected power information, one of various algorithms may be implemented to determine the extent of power correction that may be needed. Furthermore, based on a given transceiver, the manner of effecting changes to an output power level may vary. For example, in some embodiments a transceiver may include a digital variable gain amplifier (DVGA). Based on the analysis of an output power level, the DVGA level may be controlled accordingly. However, in other embodiments analog power levels, e.g., of an analog VGA or other components within or external to a transceiver may be controlled to effect desired power corrections.

Figure 2:
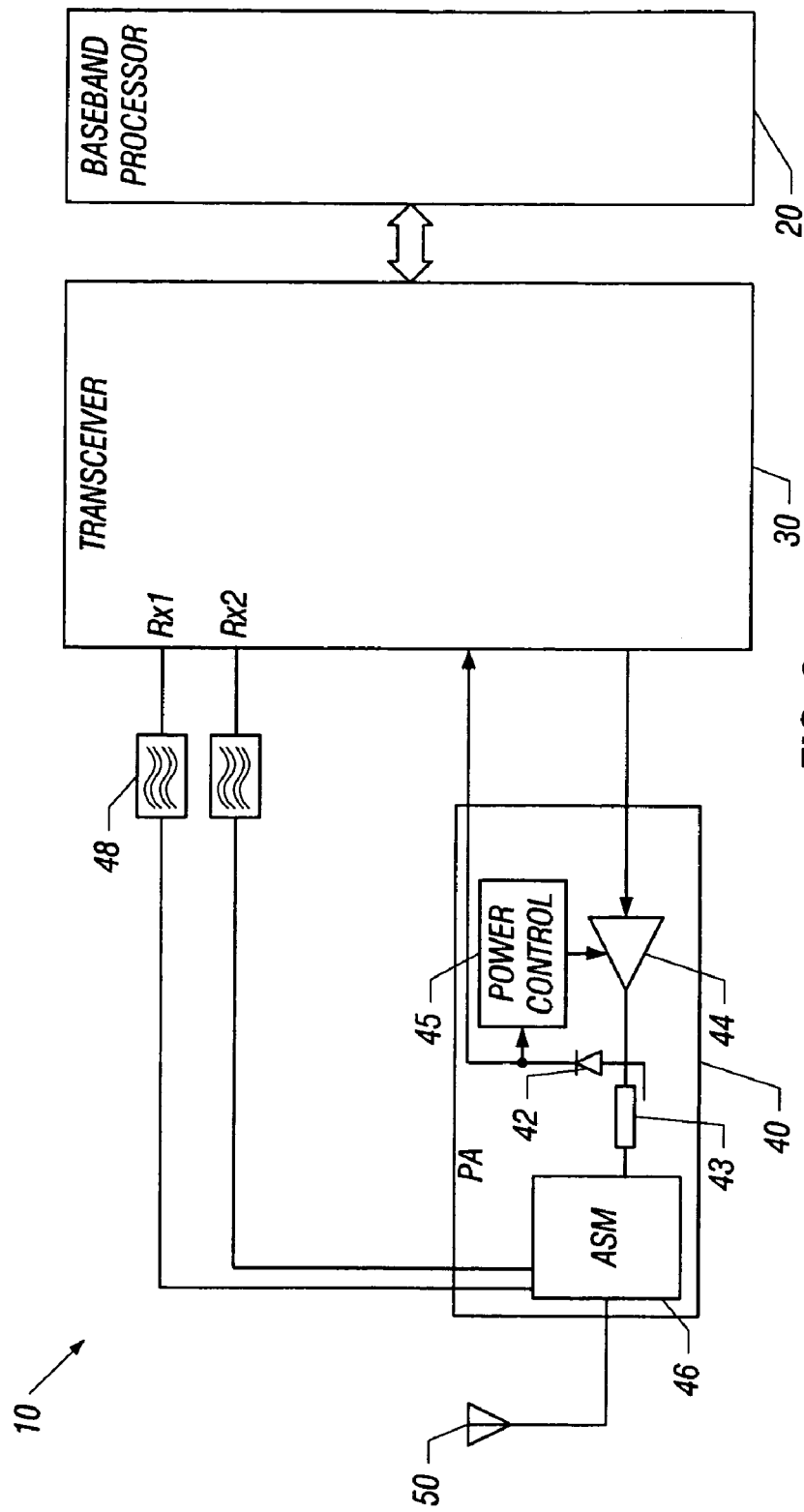
FIG. 2 is a block diagram of a portion of a system in accordance with one embodiment of the present invention.

Referring now to FIG. 2, shown is a block diagram of a portion of a system in accordance with one embodiment of the present invention. As shown in FIG. 2, system 10 includes a baseband processor 20 coupled to a transceiver 30 which in turn is coupled to a PA 40 having an antenna 50 coupled thereto. During transmissions, baseband data may be provided from baseband processor 20 to transceiver 30. Transceiver 30 may perform various processing to upconvert the data to radio frequency (RF) and provide RF signaling at a given power level to PA 40. In turn PA 40 may further amplify the signal for output via antenna 50.

To meet requirements of different manufacturers and various wireless standards, extremely tight tolerances on transmit power levels exist. Thus a tight variation on forward output power from antenna 50 may exist. While a manufacturer can set nominal levels for output power using nominal load values for the antenna, during actual operation in a given radio environment, this load can vary widely and as a result, so too can the transmitted power level vary. To prevent power variations that can negatively impact performance, embodiments may perform closed loop power control in various communication protocols. For example, in some embodiments a time division multiple access (TDMA) communication system may communicate data according to different modulation schemes, such as an 8 phase shift keying (8-PSK) or a Gaussian minimum shift keying (GMSK) scheme. Furthermore, in some implementations such modulation schemes may vary from slot to slot. In these implementations, measurements made during an 8-PSK burst may be used to control power during a succeeding GMSK burst and vice versa. Other implementations may be used in a wideband code division multiple access (WCDMA) communication system, for example. In such implementations, a power level may be detected at a peak and a knowledge of the symbol(s) being transmitted at that peak may be used to determine a difference between the detected power level and a target power level.

Using embodiments of the present invention, feedback information obtained from PA 40 may be used in transceiver 30 to control the power output of the RF signals provided from transceiver 30. Thus as shown in FIG. 2, a feedback loop may be present that includes a detector 42, e.g., a diode detector to detect a voltage level received via a coupler 43 at an output of an amplifier 44 of PA 40. This detected voltage may be fed back to transceiver 30 as a voltage signal, $V_{DET}$. Note that PA 40 may further include a power controller 45, which may inherently control transmit power for, e.g., a GMSK mode in a closed-loop fashion, but cannot perform closed-loop control for an 8-PSK or other such modes. Other embodiments may lack such a controller or may have a differently configured controller.

As further shown in FIG. 2, an antenna switch 46, which may be a single pole multiple throw switch may be present to switch antenna 50 from a transmit mode to a receive mode. Thus as further shown, received RF signals by antenna 50 may pass through antenna switch 46 to provide incoming RF signals for processing in transceiver 30 via one or more RF filters 48. Note that the block diagram of FIG. 2 is shown at a high level, and in various implementations, additional circuitry may be present within a power amplifier. For example, in various implementations multiple RF paths may be present to provide for transmission of RF signals of a low band and a high band. Similarly, additional circuitry such as other inherent power control circuitry, detectors, couplers, and so forth may be present.

Based on the detected power information, transceiver 30 may perform power control, e.g., in adjusting a level of one or more amplifiers within its transmit path. In various implementations, a burst-to-burst control may be provided such that power information obtained during a first burst may be used to calculate a correction for a following burst. Such process may continue in seriatim such that continuous feedback information may be used to provide transmit power at a substantially steady level, even in light of varying load conditions.

Figure 3:
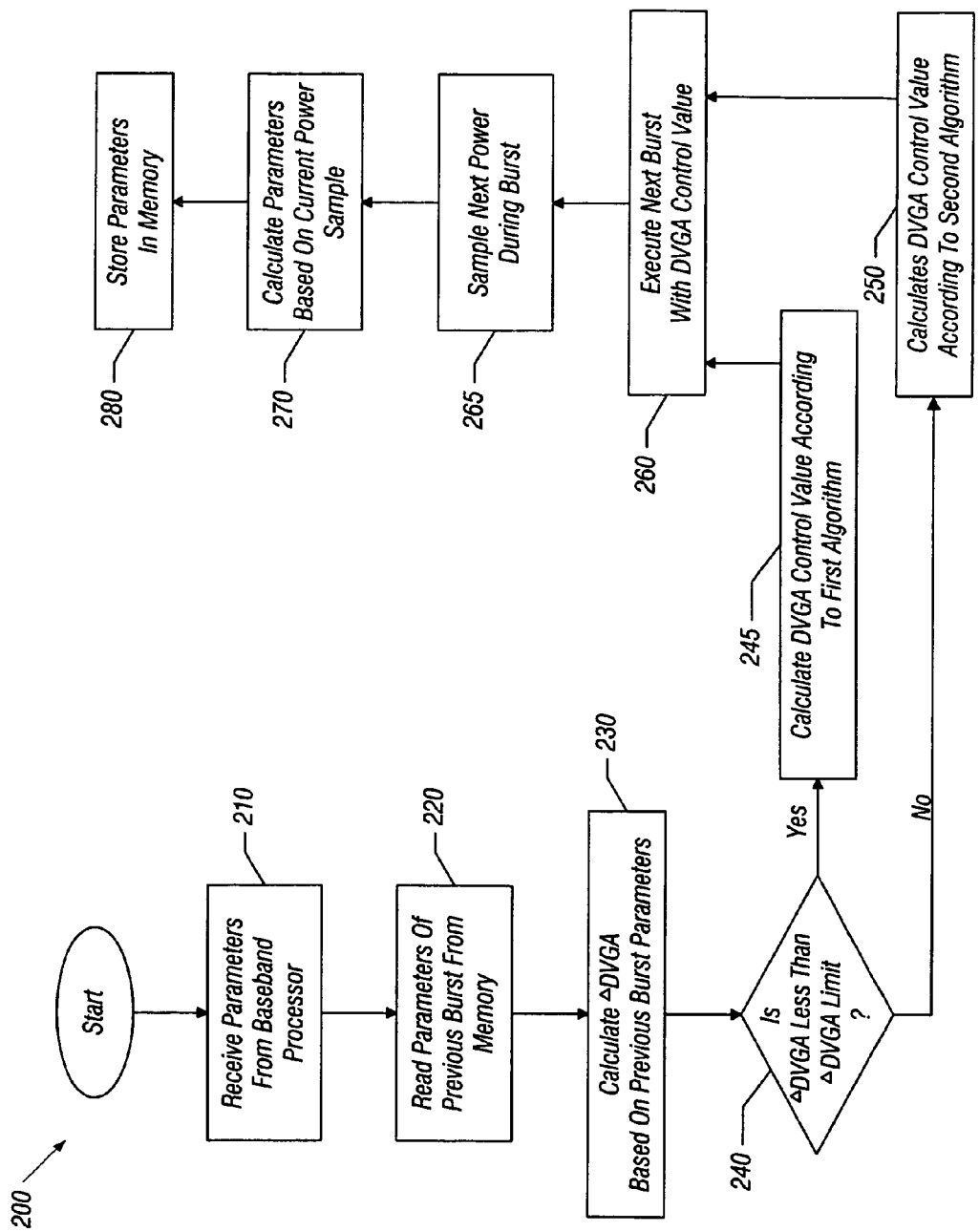
FIG. 3 is a flow diagram of a method for updating power control information in accordance with one embodiment of the present invention.

Referring now to FIG. 3, shown is a flow diagram of a method in accordance with another embodiment of the present invention. As shown in FIG. 3, method 200 may begin by receiving parameter information from a baseband processor (block 210). Such parameter information may include a nominal level for a DVGA (i.e., DVGAnom), as well as a nominal level for the detected transmit power (i.e., Vrefnom). Furthermore, the baseband processor may provide a limit to the amount of DVGA change to be implemented in a single burst (i.e., ΔDVGA_limit). This limit may be implemented to maintain linearity between bursts of a communication. Next, the transceiver may read parameters of a previous burst from a volatile memory, e.g., SRAM or other memory within the transceiver (block 220). Specifically, this information may include a calculated error from the previous burst (i.e., VdetErr_prev), as well as the change used for implementation in the current burst, which corresponds to the determined delta from the previous burst (i.e., ΔDVGA_prev). Based on this information, the transceiver may calculate a current ΔDVGA to be applied at the next burst based on the previous burst parameters (block 230). This ΔDVGA may be calculated as a function of the previous calculated error and the previous ΔDVGA. Note that in this regard, the terms current and previous may be used interchangeably. That is, depending upon when the calculation of a transmit power level for a next burst is performed, the burst against which it is measured may be a current burst (i.e., if the calculation takes place during transmission of the current burst), or it may be a previous burst if the calculation takes place after transmission of the burst has completed.

Next it may be determined whether this calculated ΔDVGA is less than the predetermined limit (diamond 240). If so, the transceiver may calculate the value to control the DVGA in accordance with a first algorithm (block 245). In one embodiment, this algorithm may correspond to a calculation of the nominal DVGA level plus the ΔDVGA. If instead, the calculated ΔDVGA determined at diamond 240 is above the limit, the transceiver may calculate the DVGA in accordance with a second algorithm (block 250). In one embodiment, this second algorithm may calculate the DVGA control value as the nominal DVGA level plus the limit value. In either event, the next burst may be executed using the calculated DVGA setting (block 260). During this burst, the power level may be detected at the PA (block 265). This power level may be detected based on a voltage received from the PA, i.e., Vdet. The transceiver may calculate parameters to be used during the next burst based on the current power sample (block 270). In one embodiment, the transceiver may set a value for the previous ΔDVGA value, i.e., ΔDVGA_prev, to be equal to the calculated ΔDVGA (i.e., obtained in block 230). The transceiver may also calculate a previous detected error difference, i.e., VdetErr_prev, as a function of the actual detected power level and the nominal reference power level (Vrefnom). This information may then be stored in volatile memory of the transceiver for use in the correction of a following burst (block 280).

While the scope of the present invention is not limited in this regard, in various embodiments the detected power may be sampled at a selected part of a burst. For example, in an 8-PSK burst, the power level may be detected during a training sequence of a burst. In an 8-PSK burst, transmission of a training sequence may occur in a midamble portion of the burst. That is, after ramp up and transmission of tail symbols, a first useful data portion may be transmitted, a midamble training sequence, and a final useful data portion, prior to ramp down. In some implementations, a burst may include three tail symbols, a first useful data portion of 58 symbols, a 26 symbol midamble, another 58 data symbol useful data portion, and a final three symbol tail portion.

In other embodiments, the power level may be detected during transmission of a tail symbol portion, as such symbols provide well-behaved modulation and may be independent of burst data. Furthermore, such symbols may be transmitted at a relatively flat level with a well-defined power plateau at close to the burst RMS power. In other embodiments, such as for use in a CDMA scheme, a power level may be detected at a peak level of a time slot in which known data is transmitted. In various embodiments, a transceiver may sample the detected power level at two times the symbol rate or higher and may detect at peak power levels, in some implementations.

Figure 4:
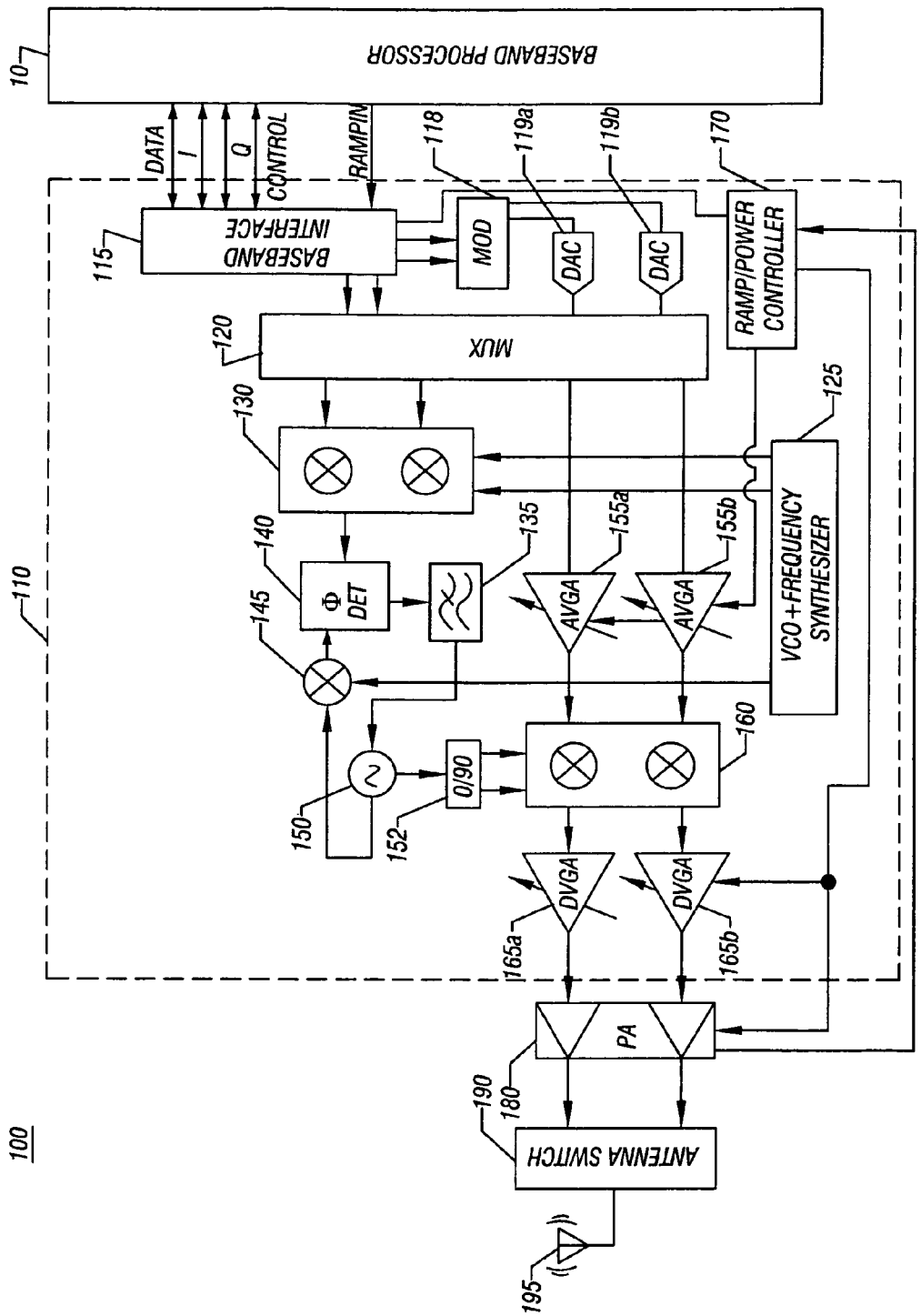
FIG. 4 is a block diagram of a transceiver in accordance with an embodiment of the present invention.

Embodiments may be implemented in many different radio frequency IC's (RFICs), such as transceivers and so forth. Referring now to FIG. 4, shown is a block diagram of a transceiver in accordance with an embodiment of the present invention. As shown in FIG. 4, a transceiver 110 may be implemented in a system 100 such as a wireless device, e.g., a cellular telephone handset, personal digital assistant (PDA) or other such device. Transceiver 110 may include both receive and transmit circuitry, although the transmit circuitry only is shown in the embodiment of FIG. 4 for ease of illustration. As shown in FIG. 4, transceiver 110 is coupled to a baseband processor 10. Accordingly, baseband communication may occur between transceiver 110 and baseband processor 10. Transceiver 110 is further coupled to a PA 180, which in turn is coupled to an antenna switch 190 that itself is coupled to an antenna 195. Note that a feedback path is coupled from PA 180 back to transceiver 110 to provide detected power levels in accordance with an embodiment of the present invention. Transceiver 110 may be adapted in a single IC transceiver that includes both receive and transmit paths and various control circuitry, in one embodiment.

Still referring to FIG. 4, transceiver 110 includes various circuitry to enable receipt of baseband signals from baseband processor 10 and processing thereof to provide RF outputs to PA 180. Accordingly, transceiver 110 includes a baseband interface 115, which may be a digital interface, e.g., in accordance with the DigRF specification to provide coupling to baseband processor 10. As shown in FIG. 4, baseband interface 115 is coupled in a bidirectional manner with baseband processor 10 to enable transmission and receipt of baseband I and Q signals, as well as the receipt of incoming control signals (e.g., power control information and ramp control signals) from baseband processor 10. Of course, additional control signals for controlling operation of transceiver 110 may further be received from baseband processor 10.

Baseband data signals are provided from baseband interface 115 to a modulator 118, where the digital signals may be modulated. The modulated signals may then be output to a pair of digital-to-analog converters (DACs) 119a and 119b to generate analog I and Q signals that are provided to a multiplexer 120. Multiplexer 120 may be controlled to provide outputs to different paths depending on the mode of operation (e.g., GMSK mode or 8-PSK mode).

In various implementations, multiplexer 120 may provide incoming baseband signals to a selected one of multiple transmission paths. Thus the embodiment of FIG. 4 shows a dual transmitter design in which different transmit paths are present. These different paths may be controlled differently in different modes of operation. For example, in a GMSK mode, I/Q signals are provided to a first transmission path including an offset phase lock loop (OPLL), while in an 8-PSK mode, I/Q signals are provided to a second transmission path including a digital variable gain mixer.

In GMSK mode, I and Q data is provided to the first transmission path that includes a mixer 130 which may be an intermediate frequency (IF) mixer, which is controlled to mix the incoming signals with a frequency provided by a frequency synthesizer 125. The signals from frequency synthesizer 125 provided to mixer 130 are used to upconvert the I and Q signals to a desired intermediate frequency.

As shown in FIG. 4, the OPLL may include a phase detector 140, which is coupled to receive the upconverted modulated signals from mixer 130. As further shown in FIG. 4, phase detector 140 is further coupled to receive an output from a mixer 145. Mixer 145 in turn is controlled via another output from frequency synthesizer 125. Feedback will operate to equalize the phase of the inputs to phase detector 140, and in so doing, the frequency also.

In turn, the output of phase detector 140 is provided to a filter 135. The filtered output is fed to a local oscillator (LO) 150 that is coupled in a feedback loop with mixer 145. The output of mixer 145 equals the sum/difference frequency of the inputs thereto, namely the output of LO 150, and the output of frequency synthesizer 125. By controlling a frequency output from frequency synthesizer 125, the output of LO 150 is a modulated signal generated at a desired frequency, which is output to a divider/quadrature phase shifter 152 which provides complex signals to a mixer 160 of the second transmission path.

A mixer 160 and DVGA 165 of the second transmission path may form a digital variable gain mixer. That is, while shown as separate components in the embodiment of FIG. 4, mixer 160 and DVGA 165 may be implemented with unified circuitry, in some embodiments.

The signals amplified in DVGA 165 are thus provided out of transceiver 110. Transceiver 110 may be coupled to PA 180 that receives the RF signals from transceiver 110. Furthermore, as shown in FIG. 4, PA 180 may be controlled via signals received from transceiver 110.

Referring still to FIG. 4, the second transmission path of transceiver 110 enables transmission of signals of a different mode of operation than the first transmission path. Specifically, as shown in FIG. 4, the second transmission path is coupled to receive I and Q data from multiplexer 120 at a pair of analog variable gain amplifiers/attenuators (AVGAs) 155a and 155b (generically AVGA 155). The output signals from these amplifiers/attenuators may be filtered in respective low pass filters (LPFs) 158a and 158b (generically LPF 158). In 8-PSK mode, mixer 160 receives baseband currents from the second transmission path which are mixed with an unmodulated pure carrier signal from LO 150, which it then provides to DVGA 165 (which is also controlled by power controller 170, in 8-PSK mode) for subsequent output to PA 180.

In various embodiments, transceiver 110 further includes a ramp/power controller 170 (referred to herein as power controller). Power controller 170 may be used to provide closed-loop burst-to-burst power control in accordance with an embodiment of the present invention, as well as to generate ramp profiles. More specifically, during at least an 8-PSK mode of transceiver 110, power controller 170 may receive a detected power level from PA 180. Based on that information as well as power control information received from baseband processor 10, updated power control signals may be generated for use in a next burst of a transmission. In various implementations, power controller 170 may execute instructions that are implemented in a tangible storage medium to perform power control such as described above with regard to method 200 of FIG. 3 (for example). Using a calculated power control level, power controller 170 may thus control DVGA 165, e.g., in an 8-PSK mode to provide a burst out of transceiver 110 at a desired power level. Power controller 170 may also generate ramp profiles that may be provided for use both within transceiver 110 (e.g., in a 8-PSK mode) and by PA 180 (e.g., in a GMSK mode). That is, AVGAs 155a and 155b may be controlled by ramp signals generated by power controller 170 in 8-PSK mode.

Figure 5:
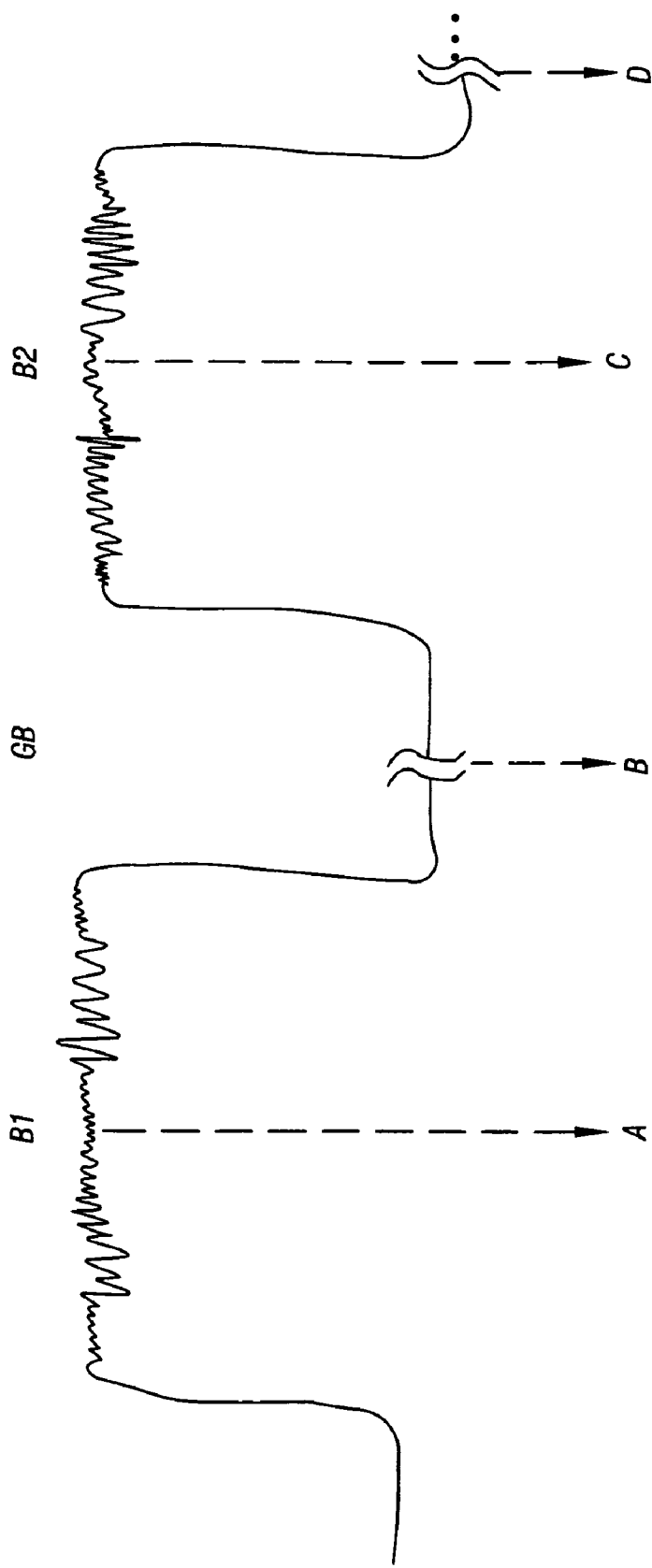
FIG. 5 is a timing diagram for a multi-slot burst communication in accordance with an embodiment of the present invention.

Referring now to FIG. 5, a timing diagram for a multi-slot burst communication is shown. Specifically, two bursts are shown, a first burst B1 and a second burst B2 with a guard interval GB therebetween. While shown with only two such bursts in the embodiment of FIG. 5 for ease of illustration, a multi-slot communication burst may have many more such bursts. In one embodiment, the bursts may be 8-PSK modulation bursts of an EDGE protocol, although the scope of the present invention is not limited in this regard.

As shown in FIG. 5, at a first time instant A, a power sample may be detected, e.g., at a power amplifier. This detected power level may then be used to determine an appropriate power level for the next burst B2. Specifically, a power controller or other such controller or processor may, during burst B1, determine an appropriate power level. However, this power level is not applied until during the guard interval, i.e., at time B. Accordingly, next burst B2 will be generated using this updated power level. Then during burst B2, its power level may be detected, i.e., at a time C, which may be used to determine a power control level for a next burst, to be applied at a later time D. Note that in the embodiment of FIG. 5, at times A and C, power may be detected during a midamble portion of the burst, during which a training sequence is transmitted, although the scope of the present invention is not limited in this regard. Instead, power may be detected during other portions of a burst in other implementations. That is, a PA may continuously provide a detected power level to the transceiver and a power controller may sample the level at a desired time, e.g., at a given symbol count of a current burst.

Accordingly, in various embodiments a burst-to-burst closed-loop control implementation may be realized, enabling easing of time constraints for power control as well as improving stability and performance. Furthermore, because a transceiver in accordance with an embodiment of the present invention can operate in both open loop and closed-loop fashions, PAs of different manufacturers or of different capabilities can be used with a given transceiver.

Furthermore, burst-to-burst control enables performance that meets specification limits including forward power variation. Burst-to-burst control also enables recovery from a minimum total radiated power (TRP) under mismatch. Still further, flexible limiting is enabled such that error vector magnitude (EVM) may be maintained at the target levels and a PA is not driven into non-linear degradation as burst-to-burst closed-loop control maintains linearity. Both first burst requirements such as excess DC current and spectrum constraints due to switching transients may be met with such control, as well as requirements for excess RF output power, excess DC current, modulation spectrum and EVM.

Referring now to Tables 1 to 6, shown are implementations of performing a closed-loop burst-by-burst algorithm in accordance with embodiments of the present invention, based on various parameters. Note that the implementations represent a linear envelope detector rather than a log-amp that may be linear in decibels (i.e., linear Vdet v. power in dBm). Further these examples show cases in which changes are made in 0.5 dB steps per burst. Other embodiments may perform a correction that seeks to reach a target level in a single burst.

As shown in Table 1, a scenario for closed-loop control is presented in which a load across bursts remains constant, a ΔDVGA maximum stays below a limit level, the target power remains constant and the initial measured power is below the target.

TABLE 1

|  | Burst 1 | Burst 2 | Burst 3 | Burst 4 | Burst 5 | Burst 6 |
| --- | --- | --- | --- | --- | --- | --- |
| Pout_Target | 27 dBm | 27 dBm | 27 dBm | 27 dBm | 27 dBm | 27 dBm |
| PoutFwd_Meas | 25.5 dBm | 26 dBm | 26.5 dBm | 27 dBm | 27 dBm | 27 dBm |
| Pdiff | −1.5 dB | −1 dB | −0.5 dB | 0 dB | 0 dB | 0 dB |
| Vref_Target | 0.70919 V | 0.70919 V | 0.70919 V | 0.70919 V | 0.70919 V | 0.70919 V |
| Vdet_Meas | 0.59406 V | 0.63025 V | 0.66858 V | 0.70919 V | 0.70919 V | 0.70919 V |
| VdetDiff_Meas | 0.11513 V | 0.07894 V | 0.0406 V | 0 V | 0 V | 0 V |
| ΔDVGA | 0 | 1 | 2 | 3 | 3 | 3 |
| DVGA | 65 | 66 | 67 | 68 | 68 | 68 |

Thus as shown in Table 1, a control value for the DVGA is updated for each burst based on the ΔDVGA calculated.

Table 2 shows a scenario in which the load across bursts remains constant, a ΔDVGA maximum value hits the limit value (four in this example), the target power remains constant and the initial measured power is below the target.

TABLE 2

|  | Burst 1 | Burst 2 | Burst 3 | Burst 4 | Burst 5 | Burst 6 |
| --- | --- | --- | --- | --- | --- | --- |
| Pout_Target | 27 dBm | 27 dBm | 27 dBm | 27 dBm | 27 dBm | 27 dBm |
| PoutFwd_Meas | 24 dBm | 24.5 dBm | 25 dBm | 25.5 dBm | 26 dBm | 26 dBm |
| Pdiff | −3 dB | −2.5 dB | −2 dB | −1.5 dB | −1 dB | −1 dB |
| Vref_Target | 0.70919 V | 0.70919 V | 0.70919 V | 0.70919 V | 0.70919 V | 0.70919 V |
| Vdet_Meas | 0.49719 V | 0.52764 V | 0.55989 V | 0.59406 V | 0.63025 V | 0.63025 V |
| VdetDiff_Meas | 0.212 V | 0.18155 V | 0.14929 V | 0.11513 V | 0.07894 V | 0.07894 V |
| ΔDVGA | 0 | 1 | 2 | 3 | 4 | 4 |
| DVGA | 65 | 66 | 67 | 68 | 69 | 69 |

Accordingly, as shown in Table 2, the ΔDVGA is prevented from exceeding the maximum.

Table 3 shows a scenario in which the initial measured power is above the target level.

TABLE 3

| | Burst 1 | Burst 2 | Burst 3 | Burst 4 | Burst 5 | Burst 6 |
|---|---|---|---|---|---|---|
| Pout_Target | 27 dBm | 27 dBm | 27 dBm | 27 dBm | 27 dBm | 27 dBm |
| PoutFwd_Meas | 28.5 dBm | 28 dBm | 27.5 dBm | 27 dBm | 27 dBm | 27 dBm |
| Pdiff | 1.5 dB | 1 dB | 0.5 dB | 0 dB | 0 dB | 0 dB |
| Vref_Target | 0.70919 V | 0.70919 V | 0.70919 V | 0.70919 V | 0.70919 V | 0.70919 V |
| Vdet_Meas | 0.84602 V | 0.79776 V | 0.7522 V | 0.70919 V | 0.70919 V | 0.70919 V |
| VdetDiff_Meas | −0.1368 V | −0.0886 V | −0.043 V | 0 V | 0 V | 0 V |
| ΔDVGA | 0 | −1 | −2 | −3 | −3 | −3 |
| DVGA | 65 | 64 | 63 | 62 | 62 | 62 |

As shown in Table 3, the control value for the DVGA decreases over time.

In Table 4, the target power, instead of remaining constant, decreases at the third burst.

TABLE 4

| | Burst 1 | Burst 2 | Burst 3 | Burst 4 | Burst 5 | Burst 6 |
|---|---|---|---|---|---|---|
| Pout_Target | 27 dBm | 27 dBm | 25 dBm | 25 dBm | 25 dBm | 25 dBm |
| PoutFwd_Meas | 27 dBm | 27 dBm | 25 dBm | 25 dBm | 25 dBm | 25 dBm |
| Pdiff | 0 dB | 0 dB | 0 dB | 0 dB | 0 dB | 0 dB |
| Vref_Target | 0.70919 V | 0.70919 V | 0.55989 V | 0.55989 V | 0.55989 V | 0.55989 V |
| Vdet_Meas | 0.70919 V | 0.70919 V | 0.55989 V | 0.55989 V | 0.55989 V | 0.55989 V |
| VdetDiff_Meas | 0 V | 0 V | 0 V | 0 V | 0 V | 0 V |
| ΔDVGA | 0 | 0 | 0 | 0 | 0 | 0 |
| DVGA | 65 | 65 | 61 | 61 | 61 | 61 |

Accordingly, as shown in Table 4, the DVGA control value is decremented by the new nominal value in the third burst.

In contrast in Table 5, the target power increases in the third burst and the initial measured power is below the target level.

TABLE 5

| | Burst 1 | Burst 2 | Burst 3 | Burst 4 | Burst 5 | Burst 6 |
|---|---|---|---|---|---|---|
| Pout_Target | 25 dBm | 25 dBm | 27 dBm | 27 dBm | 27 dBm | 27 dBm |
| PoutFwd_Meas | 23.5 dBm | 24 dBm | 26.5 dBm | 27 dBm | 27 dBm | 27 dBm |
| Pdiff | −1.5 dB | −1 dB | −0.5 dB | 0 dB | 0 dB | 0 dB |
| Vref_Target | 0.55989 V | 0.55989 V | 0.70919 V | 0.70919 V | 0.70919 V | 0.70919 V |
| Vdet_Meas | 0.46845 V | 0.49719 V | 0.66858 V | 0.70919 V | 0.70919 V | 0.70919 V |
| VdetDiff_Meas | 0.09145 V | 0.0627 V | 0.0406 V | 0 V | 0 V | 0 V |
| ΔDVGA | 0 | 1 | 2 | 3 | 3 | 3 |
| DVGA | 61 | 62 | 67 | 68 | 68 | 68 |

Thus as shown in Table 5, the DVGA control value increases throughout the burst.

Similar control values for the DVGA may be present in Table 6 in which the ΔDVGA maximum hits the limit value and where the target power increases in the third burst and the initial measured power is below the target.

TABLE 6

| | Burst 1 | Burst 2 | Burst 3 | Burst 4 | Burst 5 | Burst 6 |
|---|---|---|---|---|---|---|
| Pout_Target | 25 dBm | 25 dBm | 27 dBm | 27 dBm | 27 dBm | 27 dBm |
| PoutFwd_Meas | 22.5 dBm | 23 dBm | 25.5 dBm | 26 dBm | 26.5 dBm | 26.5 dBm |
| Pdiff | −2.5 dB | −2 dB | −1.5 dB | −1 dB | −0.5 dB | −0.5 dB |
| Vref_Target | 0.55989 V | 0.55989 V | 0.70919 V | 0.70919 V | 0.70919 V | 0.70919 V |
| Vdet_Meas | 0.41569 V | 0.44131 V | 0.59406 V | 0.63025 V | 0.66858 V | 0.66858 V |
| VdetDiff_Meas | 0.14421 V | 0.11859 V | 0.11513 V | 0.07894 V | 0.0406 V | 0.0406 V |
| ΔDVGA | 0 | 1 | 2 | 3 | 4 | 4 |
| DVGA | 61 | 62 | 67 | 68 | 69 | 69 |

Accordingly, as shown in Table 6, control values for the DVGA increase similarly to that shown in Table 5.

Figure 6:
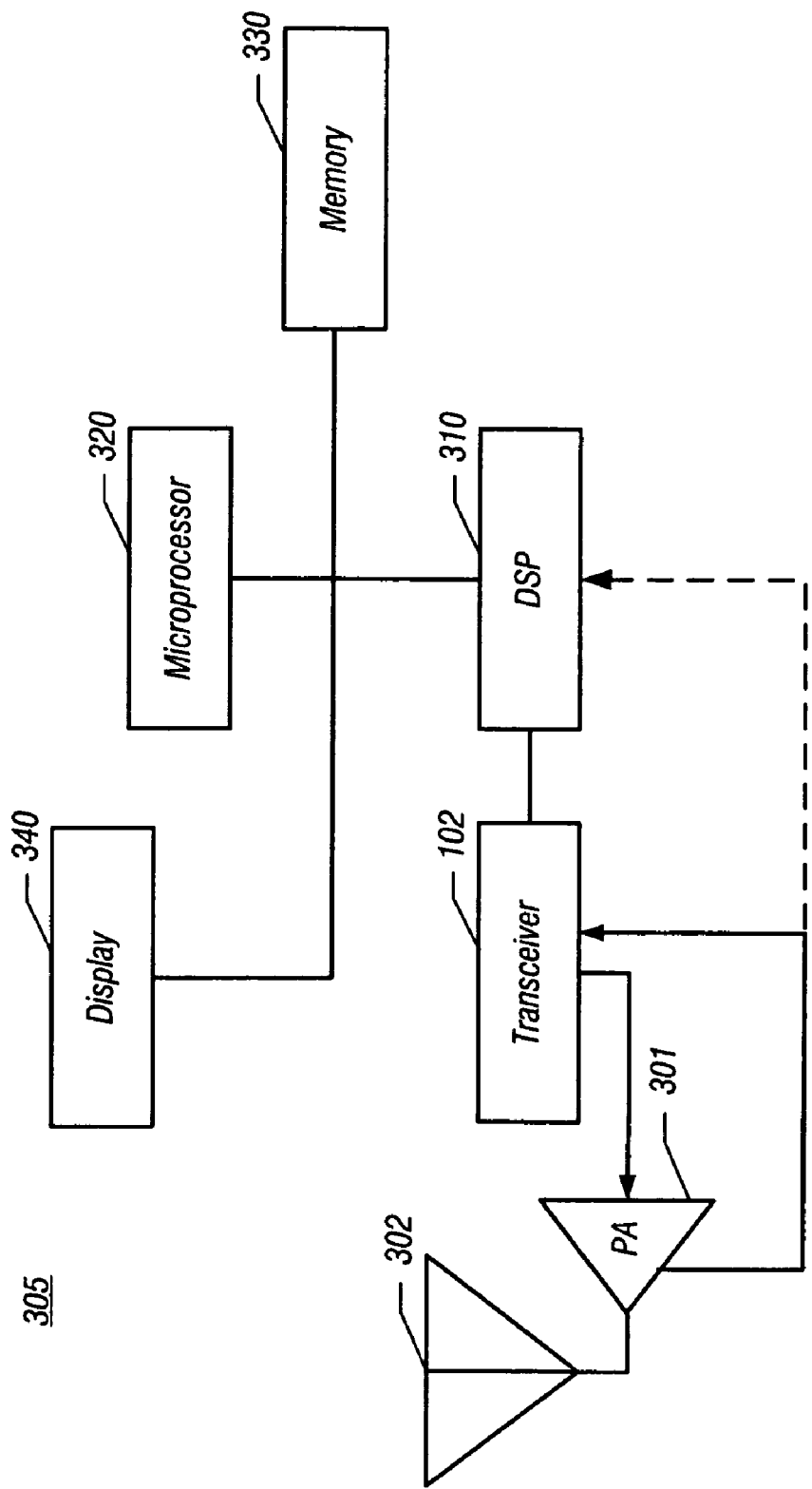
FIG. 6 is a block diagram of a system in accordance with an embodiment of the present invention.

A transceiver in accordance with an embodiment of the present invention can be implemented in many different systems. As one example, referring now to FIG. 6, shown is a block diagram of a system in accordance with an embodiment of the present invention. As shown in FIG. 6, system 305 may be a cellular telephone handset, although the scope of the present invention is not so limited. For example, in other embodiments, the system may be a pager, personal digital assistant (PDA) or other such device. As shown, an antenna 302 may be coupled via a PA 301 to a transceiver 102, which may correspond to transceiver 110 of FIG. 4. Note that PA 301 may, in various embodiments, provide power feedback information to transceiver 102 and/or a digital signal processor (DSP) 310, which may handle processing of baseband communication signals. In turn, DSP 310 may be coupled to a microprocessor 320, such as a central processing unit (CPU) that may be used to control operation of system 305 and further handle processing of application programs, such as personal information management (PIM) programs, email programs, downloaded games, and the like. Microprocessor 320 and DSP 310 may also be coupled to a memory 330. Memory 330 may include different memory components, such as a flash memory and a read only memory (ROM), although the scope of the present invention is not so limited. Furthermore, as shown in FIG. 6, a display 340 may be present to provide display of information associated with telephone calls and application programs. Although the description makes reference to specific components of system 305, it is contemplated that numerous modifications and variations of the described and illustrated embodiments may be possible. Furthermore, transceiver 102 and/or DSP 310 may include an article in the form of a machine-readable storage medium (or may be coupled to such an article, e.g., memory 330) onto which there are stored instructions and data that form a software program. The software program may provide for control of transceiver 102 and/or PA 301 for enabling burst-to-burst power control in accordance with an embodiment of the present invention.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
receiving, during a first mode of operation, a detected power level of a power amplifier in a transceiver section coupled to the power amplifier via a feedback path coupled between the power amplifier and the transceiver section during a current burst of a radio communication from a mobile station;
calculating, in the transceiver section, a power level of the power amplifier during a next burst of the radio communication based on the detected power level of the current burst, and controlling a power output of a radio frequency (RF) signal provided by the transceiver section to the power amplifier based on the calculation, the transceiver section not including a baseband section; and
receiving, during a second mode of operation, the detected power level in a controller of the power amplifier and controlling transmit power from the power amplifier based thereon.

2. The method of claim 1, further comprising maintaining the power level of the power amplifier for the current burst during the current burst.

3. The method of claim 1, further comprising determining a correction value for a variable gain amplifier of the transceiver section based on the detected power level.

4. The method of claim 3, further comprising determining a control value for the variable gain amplifier based on the correction value, a previous correction value, a threshold level for the detected power level, and a correction value limit.

5. The method of claim 4, further comprising determining the correction value based on a sum of:
a function of a difference between the detected power level and the threshold level; and
the previous correction value.

6. The method of claim 4, further comprising receiving the threshold level and the correction value limit from a baseband processor coupled to the transceiver section.

7. The method of claim 1, further comprising detecting the power level during transmission of a training sequence of the current burst.

8. The method of claim 7, wherein the training sequence is present in a midamble portion of the burst.

9. A transceiver section comprising:
an interface to receive transmit power control information from a processor, wherein the transceiver section is separate from the processor, the processor is a baseband processor;
a memory to store first parameter information for a first burst of a data transmission from the transceiver section;
a controller coupled to the interface and the memory to receive the transmit power control information and the first parameter information and to determine second parameter information for a second burst of the data transmission based on the first parameter information and the transmit power control information, the second burst following the first burst, wherein the controller is to receive, in a first mode of operation, power sample information from a power amplifier coupled to the transceiver section and determine the second parameter information further based on the received power sample information;
circuitry to receive a baseband signal from the processor, modulate the baseband signal, upconvert the modulated baseband signal to an intermediate frequency (IF) signal, and upconvert the IF signal to a radio frequency (RF) signal; and
a controllable amplifier controlled by the second parameter information to output the RF signal from the transceiver section to the power amplifier at a desired power level, wherein in a second mode of operation, the power amplifier is to control transmit power without the power sample information received by the controller.

10. The transceiver section of claim 9, wherein the controller is to sample the power sample information from the power amplifier during a midamble portion of the first burst.

11. The transceiver section of claim 9, wherein the transceiver section is to operate in a closed-loop mode if the power sample information is present, otherwise the transceiver section to operate in an open-loop mode.

12. The transceiver section of claim 9, wherein the controllable amplifier comprises a digital variable gain amplifier (DVGA) to be controlled by the second parameter information during the second burst.

13. The transceiver section of claim 12, wherein the transmit power control information comprises a threshold level for the power amplifier and a maximum correction value.

14. The transceiver section of claim 13, wherein the first parameter information comprises a correction value indicative of an amount of control change for the DVGA and a difference between the power sample information and the threshold level.

15. The transceiver section of claim 14, wherein the controller is to determine the second parameter information according to a first algorithm if the correction value is less than a threshold, otherwise according to a second algorithm.

16. An article comprising a machine-readable medium including instructions that enable a system to:
receive, in a first mode of operation, a detected power level of a first burst of a multi-slot burst communication from a power amplifier (PA) in a transceiver section coupled to the PA via a feedback path coupled between the PA and the transceiver section, the transceiver section not including a baseband section;

determine, in the transceiver section, a power level update for a second burst of the multi-slot burst communication based at least in part on the detected power level of the first burst;

provide the second burst to the PA from the transceiver section responsive to the power level update in the first mode of operation; and receive, during a second mode of operation, the detected power level in a controller of the power amplifier and control transmit power from the power amplifier based thereon.

17. The article of claim 16, wherein the instructions further enable the system to receive transmit power control information from a processor of the baseband section to the transceiver section, the transmit power control information including a nominal power level.

18. The article of claim 17, wherein the instructions further enable the system to compare, in the transceiver section, the transmit power control information to the detected power level and determine the power level update based at least in part on the comparison.

19. The article of claim 17, wherein the instructions further enable the system to limit the power level update to a predetermined maximum, wherein the predetermined maximum is received from the processor.

20. The article of claim 16, wherein the instructions further enable the system to control a digital variable gain amplifier (DVGA) of the transceiver section to generate the second burst based on the power level update.

21. The article of claim 16, wherein the instructions further enable the system to sample the detected power level during a training sequence within the first burst.

22. A system comprising:
a transceiver having an interface to receive power control information from a processor, wherein the transceiver is separate from the processor and the processor is a baseband processor, a controllable amplifier to amplify a radio frequency (RF) signal responsive to a power control update, and a controller coupled to the interface to, during a first mode of operation, determine the power control update for a succeeding burst of a multi-slot burst communication based on the power control information and feedback information from a power amplifier coupled to the transceiver from a preceding burst of the multi-slot burst communication, the controller to determine the power control update during the preceding burst and to apply the power control update to the controllable amplifier during an inter-burst period between the preceding burst and the succeeding burst;

the power amplifier coupled to the transceiver to provide the feedback information, wherein the power amplifier further includes a controller to, during a second mode of operation, control transmit power from the power amplifier based on the feedback information from the power amplifier; and an antenna coupled to the power amplifier to transmit the multi-slot burst communication.

23. The system of claim 22, wherein the transceiver is to receive the power control information from the processor in a digital form.

24. The system of claim 22, wherein the controllable amplifier is to be controlled by a first power control update during the preceding burst, wherein the controller is to determine the power control update using the first power control update.

* * * * *